United States Patent [19]

Balachandran

[11] Patent Number: 6,161,006
[45] Date of Patent: Dec. 12, 2000

[54] SYSTEM AND METHOD FOR THE EARLY DETECTION OF CELLULAR TELEPHONE PIRACY

[75] Inventor: Shridharan Balachandran, Garland, Tex.

[73] Assignee: Ericsson Inc., Research Triangle Park, N.C.

[21] Appl. No.: 08/996,089

[22] Filed: Dec. 22, 1997

[51] Int. Cl.$^7$ ....................................... H04Q 7/34
[52] U.S. Cl. ........................................... 455/410; 455/433
[58] Field of Search ..................................... 455/410, 411, 455/404, 456, 403, 422, 515, 528, 435, 433, 432

[56] References Cited

U.S. PATENT DOCUMENTS 5,734,977  3/1998  Sanmugam .............................. 455/410

FOREIGN PATENT DOCUMENTS 0 544 449 A1  11/1992  European Pat. Off. .
WO 93/09640  5/1993  WIPO .
WO 96/15643  5/1996  WIPO .

OTHER PUBLICATIONS

Patel, Sarvar, *Location, Identity and Wireless Fraud Detection*, IEEE 1997, pp. 515–521.

*Primary Examiner*—Fan Tsang
*Assistant Examiner*—Philip J. Sobutka
*Attorney, Agent, or Firm*—Jenkens & Gilchrist

[57] ABSTRACT

A method and system for early piracy detection in a cellular telecommunications network is disclosed. When in idle mode, a network subscriber Mobile Station (MS) transmits a Current Location Identifier message (CLID) on a pseudo-random basis. The CLID, which contains MS identifying information, is picked up by the network and relayed to the Mobile Switching Center (MSC) covering the area in which the MS is currently located. When it receives the CLID, the MSC generates an MS-CLID message containing the CLID and the identifier of the nodes through which it has passed, including that of the MSC itself. The MS-CLID message is then sent to the system Home Location Register (HLR), which compares the MS identification and location information to that stored in its database. The system generates a piracy alarm when the comparison determines that another caller using the same identity is currently active or that a call being initiated is originating from a location distant to the last reported location of the legitimate MS, allowing the system operator to take action prior to the loss of inordinate amounts of air time.

23 Claims, 5 Drawing Sheets

SYSTEM AND METHOD FOR THE EARLY DETECTION OF CELLULAR TELEPHONE PIRACY

BACKGROUND OF THE INVENTION

1. Technical Field of the Invention

The present invention relates to cellular telephone networks and, in particular, to a system and method for the early detection of cellular piracy, more particularly to a system and method where the system operator can take action to stop unauthorized system use upon activation of a piracy alarm signal.

2. Description of the Related Art

The evolution of wireless communication over the past century, since Guglielmo Marconi's 1897 demonstration of radio's ability to provide continuous contact with ships sailing the English Channel, has been remarkable. Since Marconi's discovery, new wireline and wireless communication methods, services and standards have been adopted by people throughout the world. This evolution has been accelerating, particularly over the last ten years, during which the mobile radio communications industry has grown by orders of magnitude, fueled by numerous technological advances that have made portable radio equipment smaller, cheaper and more reliable. The exponential growth of mobile telephony will continue to rise in the coming decades as well, as this wireless network interacts with and eventually overtakes the existing wireline networks.

In order to promote compatibility of the equipment and operations of various Public Land Mobile Networks (PLMN), air-interface standards have been developed and are currently being implemented. In North America, the most widely used standard protocol is the Advanced Mobile Phone System (AMPS), which is now being supplemented by a digital version (D-AMPS). Another such standard is the Global System for Mobile Communications (GSM), used throughout Europe and in some parts of the United States. In each standard, PLMN operators set up permanent equipment to cover a given geographical area and enlist mobile subscribers. The subscriber is billed by the operator for cellular service, generally paying a base charge in addition to a variable charge based on the subscriber's use of the system.

Unfortunately, along with the popularity of cellular telephone has come cellular piracy. A pirate scans the air interface for cellular phones initiating a connection with the PLMN, exploiting initialization procedures. To begin a call, a cellular Mobile Station (MS) first transmits a signal over the air interface that includes unique MS identifying information. This identification information indicates that access to the cellular system is being requested by a system subscriber, and is used by the PLMN for, among other things, billing the subscriber for the call. An eavesdropping pirate who intercepts this initial transmission can then replicate the signal and construct a "clone," that is, an MS that transmits identical identification information.

When the clone thereafter initiates a call using the subscriber's identity, the PLMN cannot distinguish between the pirate caller and the legitimate subscriber; system access will be granted to both. The geographical location of the clone is no help in making any distinction, since the subscriber can "roam," that is, make and receive calls while located outside its home service area. Of course, the legitimate subscriber is billed for all the usage. Pirates often operate a single clone for approximately one month, after which time the subscriber will likely receive and protest an inordinately high cellular service bill. Although steps can then be taken to avoid further unauthorized use, the PLMN operator generally bears the cost of the calls already made by the clone, resulting in the loss of thousands of dollars of air-time revenue. This problem is most acute in PLMNs operating under the AMPS/D-AMPS protocols, which lack the techniques available, for example, as in the GSM environment.

At present, enforcement against pirates is difficult at best. Clones are quickly abandoned after short periods of high use, after which the pirate acquires another cloned identity. Accordingly, there exists a need for a way to detect clone use earlier so that unauthorized use may be stopped and an attempt made to track down the pirate before large amounts of air time are stolen.

SUMMARY OF THE INVENTION

To address that foregoing and other problems, the present invention proposes a system and method for initiating a clone alarm immediately when a potential piracy condition occurs. In a preferred embodiment, an idle Mobile Station (MS) belonging to a legitimate subscriber in a cellular telephone network, when not connected, transmits a Current Location Identifier message (CLID) on a pseudo-random basis. The CLID contains MS identification information. The CLID is picked up by the Base Transceiver Station (BTS) and transmitted through the Base Station Controller (BSC) to a Message Switching Center (MSC). The MSC assembles an MS Location Identifier message (MS-CLID) containing the CLID and identity of each node through which the CLID has passed. The MSC then transfers the MS-CLID to the system Home Location Register (HLR), which checks to see if an entity appearing identical to the CLID-transmitting MS is currently active. If so, a piracy condition exists and a clone alarm is transmitted to the system operator. Preferably, the frequency of the pseudo-random CLID transmissions can be varied by the system according to the current geographical location of the MS. More frequent transmissions could be made in areas known to have extensive piracy operations. In another embodiment, the identity check is performed in a separate authentication/privacy register (APR) to conserve HLR resources.

In yet another embodiment, whenever the HLR receives a registration from the MS or an MS-CLID, it updates its CLID database to reflect the new MS location information. Preferably, the location information stored in the HLR database will include the last-received MS-CLID. The HLR also initiates a transmission back to the MS so that the MS can store in non-volatile memory the MS-CLID stored in the HLR database. This stored MS-CLID is included by the MS when it next transmits a CLID. In this embodiment, when the HLR next receives an MS-CLID, then in addition to checking for active clones, it also verifies that the new MS-CLID contains within it the old MS-CLID previously returned to the MS. If not, a potential piracy condition exists because a clone is trying to emulate the MS by transmitting a CLID, and a clone alarm is transmitted to the system operator.

In yet another embodiment, the HLR also maintains information regarding the pseudo-random generation pattern that determines when an MS will transmit a CLID. Although an MS may fail to transmit a CLID at the next interval, for example because it is connected at the time, it is in this embodiment configured to transmit at an expected time. Upon receipt of an MS-CLID transmission, the HLR, in addition or as an alternative to other comparisons, verifies that the CLID was sent at an appropriate time. If not, a potential piracy condition exists and a clone alarm is transmitted to the system operator.

Upon receiving a clone alarm, the system operator can choose from several possible courses of action. For example, the operator could attempt to ascertain the suspected pirate's location, or could interrupt the suspected pirate's call to determine whether it is being placed by a legitimate subscriber. Short of investigating each alarm, the event could simply be noted and the suspected pirate's location recorded for future use. Tracking could then be initiated after a number of alarms have been received for the same MS. In any event, the system operator will have notice of a piracy situation long before a subscriber complains of an erroneous cellular telephone bill.

A more complete appreciation of the present invention and the scope thereof can be obtained from the accompanying drawings which are briefly described below, the following detailed description of the presently-preferred embodiments of the invention, and the appended claims.

BRIEF DESCRIPTION OF THE DRAWINGS

A more complete understanding of the method and apparatus of the present invention may be obtained by reference to the following detailed description when taken in conjunction with the accompanying drawings, wherein.

DETAILED DESCRIPTION OF THE DRAWINGS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
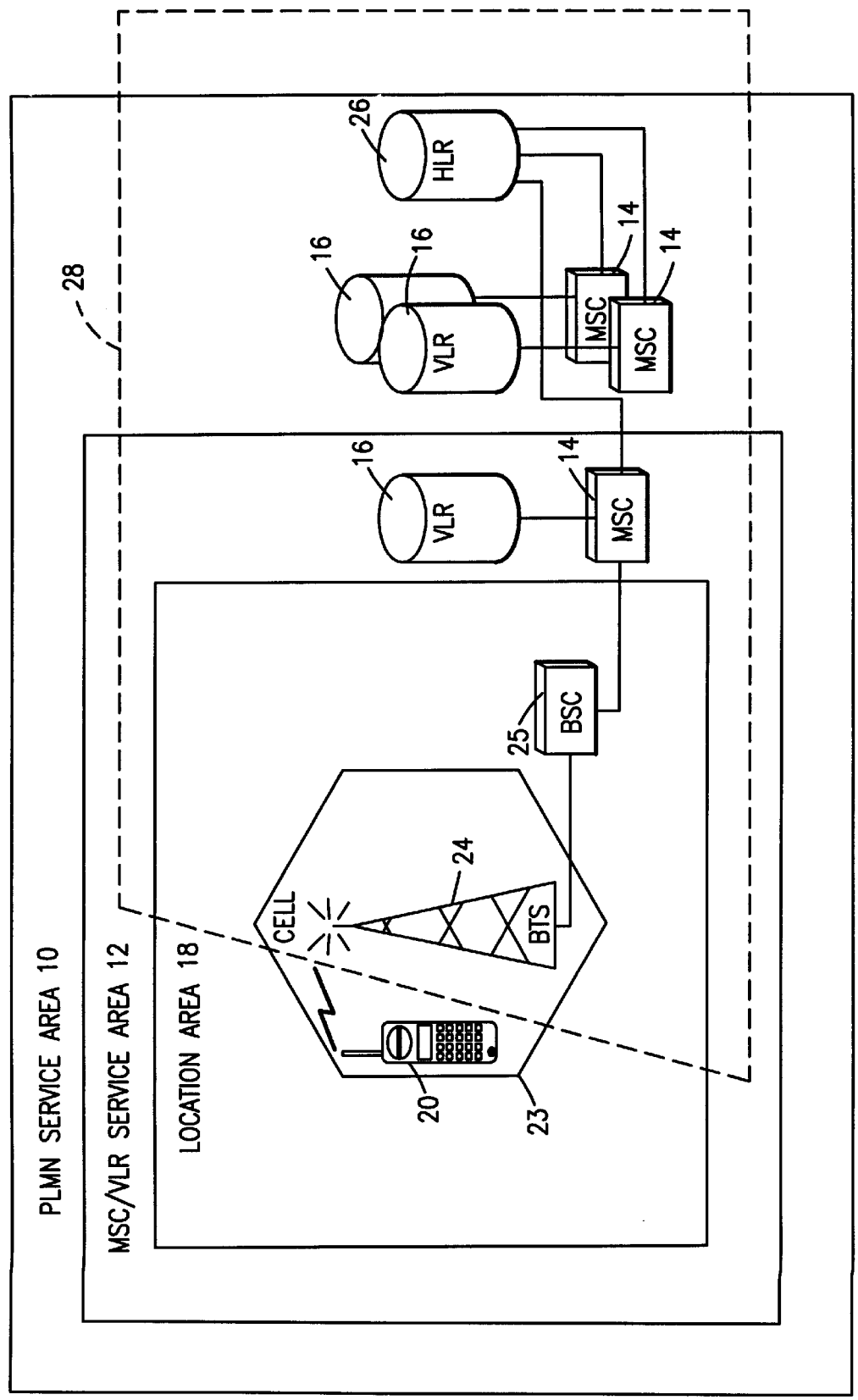
FIG. 1 is a block diagram of a telecommunications system according to the present invention.

With reference to FIG. 1 of the drawings, there is illustrated Public Land Mobile Network (PLMN) 10, such as cellular network, which in turn is composed of a plurality of areas 12, each having a Mobile Switching Center (MSC) 14 and integrated Visitor Location Register (VLR) 16 therein. The MSC/VLR areas 12, in turn, include a plurality of Location Areas (LA) 18. An LA 18 is that part of a given MSC/VLR area 12 in which a Mobile Station (MS) 20 may move freely without having to send update location information to the Home Location Register (HLR) 26, described below. Preferably, the MSCs are connected to the HLR via a Signaling System #7 (SS7) network.

Each Location Area 18 is divided into a number of cells 23. MS 20 is the physical equipment, e.g., a car phone or other portable phone, used by mobile subscribers to communicate with the cellular network 10. A Base Transceiver Station (BTS) 24 is the physical equipment, illustrated for simplicity as a radio tower, that provides radio coverage to the geographical area of the cell 23 in which to handle radio traffic to and from the MS 20. One or more BTSs are controlled by a Base Station Controller (BSC) 25, and one or more BSCs may be governed by a single MSC 14.

With further reference to FIG. 1, the PLMN Service Area or cellular network 10 includes an HLR 26, which is a database maintaining all subscriber information, e.g., user profiles, current location and routing information, and other administrative information. The HLR 26 itself may be co-located with a given MSC 14, may be an integral part of an MSC 14, or may service multiple MSCs 14; the latter configuration being illustrated in FIG. 1. In accordance with the present invention, the BTS, BSC, MSCs, VLRs and HLR together make up a network security system 28.

The MS's current location stored in the HLR 26 database is in the first instance determined through a process called registration. In registration, MS 20 transmits a registration request message on a control channel to the cell-controlling BTS 24. The BTS 24 in turn directs the message through its associated BSC 25 to MSC 14 (updating VLR 16, if necessary, such as when MS 20 is roaming), and then to HLR 26. Registration typically occurs when MS 20 is powered-up, when it roams from one LA 18 to another, or at other predetermined times, such as when a call is placed. The MS 20 location information stored on the HLR 26 is used (in conjunction with VLR 16, if necessary), for example, when a call to the MS 20 is attempted.

As discussed, to steal air time from the cellular service provider, a pirate mimics the registration process when placing a call. By scanning the air interface, the pirate picks up a registration message and constructs a clone capable of sending an identical transmission. Since calls made from the clone will be indistinguishable from legitimate calls, both will be billed to the subscriber. The subscriber and the system operator will generally be unaware that cloning has occurred until a bill charging for call made by the clone is generated. Early piracy detection can be accomplished, however, by further cooperation between the MS 20 and network security system 28.

Figure 2:
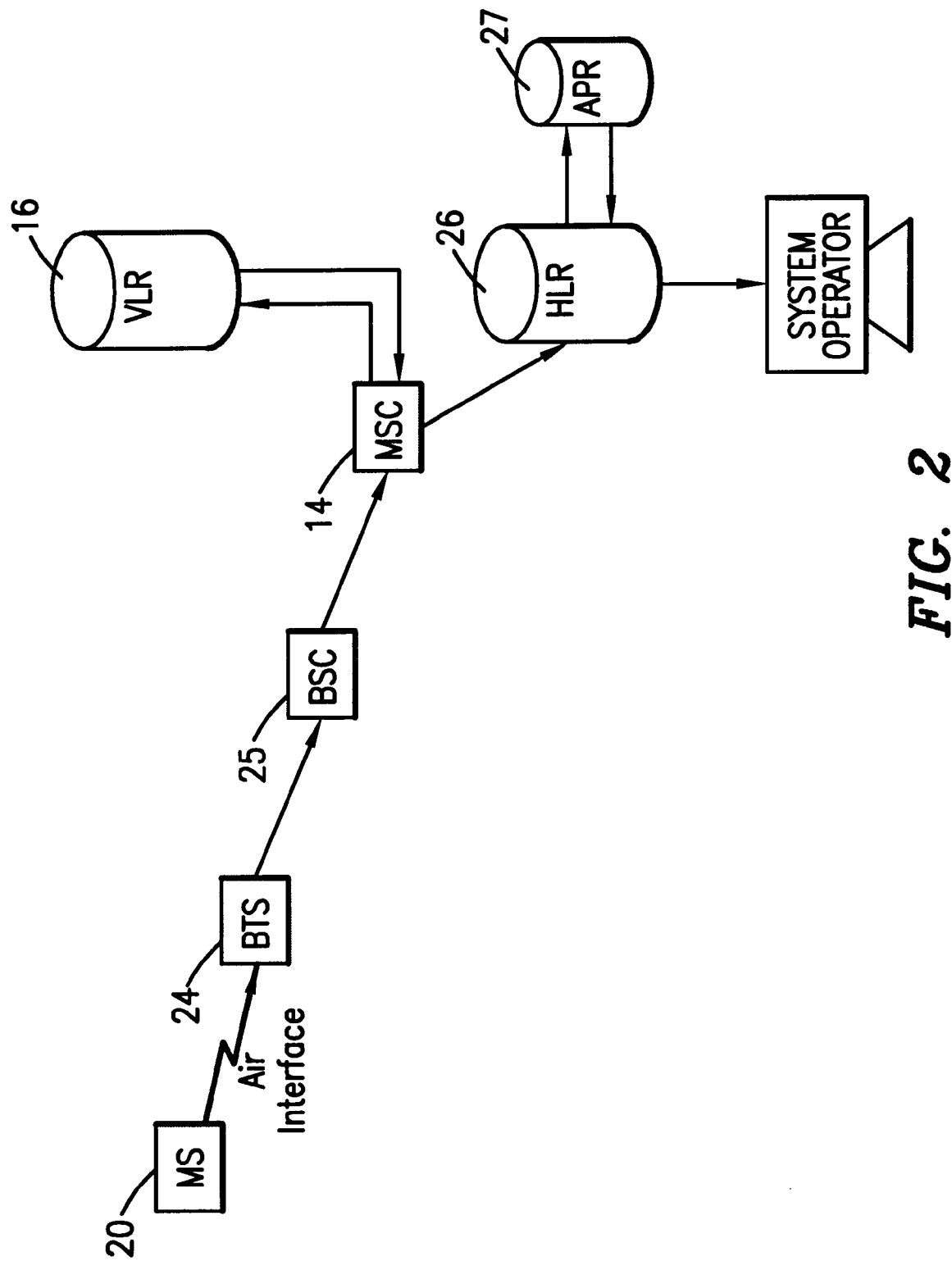
FIG. 2 is a block diagram of a telecommunications system illustrating the routing of a CLID/MS-CLID message according to the present invention.

In a preferred embodiment of the present invention, during an idle period the MS 20 generates a signal, such as a Short Message Service (SMS)/page signal, called a Current Location Identification message (CLID). The CLID contains identification information unique to MS 20. With reference now to FIG. 2, there is shown a block diagram of a telecommunications system illustrating the routing of a CLID between the MS 20 and the HLR 26 according to the present invention. As with registration, the MS 20 first transmits the CLID over a control channel on the air interface to a cell-controlling BTS 24. The BTS 24 then forwards the CLID to its BSC 25. From BSC 25, the CLID is sent to MSC 14. The MSC 14 determines the exact logical path back to MS 20, including the MSC 14 identifier, the VLR 16 identifier (if any) associated with MSC 14, the BSC identifier, and the BTS identifier. The MSC 14 then contacts HLR 26 and transmits a Mobile Station-Current Location Identifier message (MS-CLID), which includes the CLID and the aforementioned logical path identifiers. Preferably, the MS-CLID includes the CLID transmitted by the MS and the identifiers of the BTS, BSC, MSC, and (if applicable) VLR. It is not essential, however, that the MS-CLID comprise all of these elements, or that it exclude others, but it is preferable that the MS-CLID transmitted to the HLR 26 contain as precise location and signal-path information as is possible. Preferably, the CLID and MS-CLID transmissions are accomplished via a Signaling System #7 (SS7) Transaction Capabilities Application Part (TCAP) inquiry.

Figure 3:
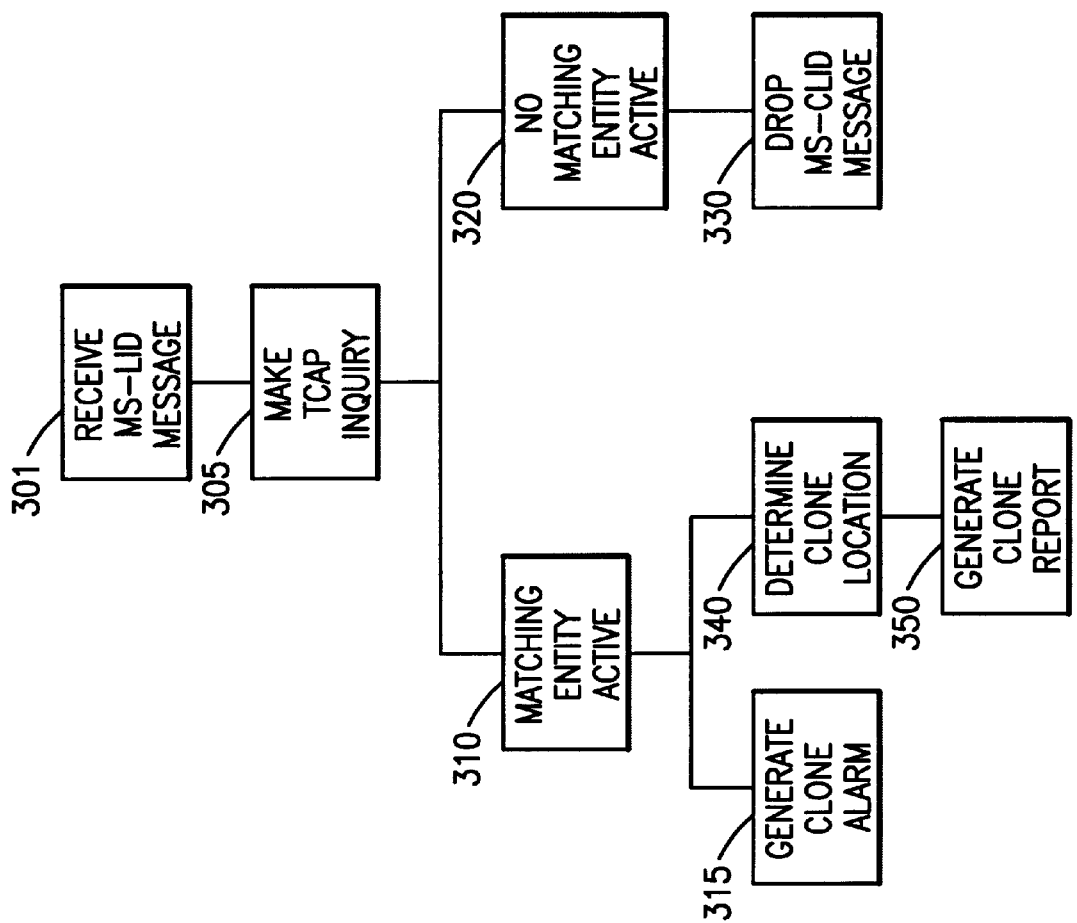
FIG. 3 is a flow chart illustrating how the system uses the MS-CLID in the piracy detection process according to one embodiment of the present invention.

Reference is now made to FIG. 3, which is a flow chart illustrating how the HLR 26 uses the MS-CLID. As heretofore discussed, in accordance with the present invention the CLID, and hence the MS-CLID, contains within it a unique identifier associated with the MS 20 that originated the CLID transmission. The HLR 26 (shown in FIG. 2) contains the application that processes the MS-CLID signal. Upon receipt of the MS-CLID, step 301, the HLR 26, at step 305, initiates another TCAP inquiry to determine whether any other entity using the same unique MS identifier is active. Since the CLID is only transmitted by an idle MS, if any VLR 16 responds affirmatively, step 310, a clone alarm is generated by the HLR 26 at step 315. Alternately, activity status information could be continually updated by the VLRs 16 and stored in the HLR 26 database, in which case the simultaneous activity determination could be made without first making a TCAP inquiry (not shown). If, on the other hand, no VLR 16 responds affirmatively, step 320, then the HLR drops the MS-CLID message without generating an alarm, step 330.

In another embodiment, the HLR 26 determines at step 340 the logical path back to the clone, that is, the entity active when the MS-CLID was received. The time of the alarm, the MS 20 location, and the clone location are then recorded for future reference, step 350.

Although the CLID can be sent any time the MS 20 is idle, it is preferably initiated on a pseudo-random basis. This prevents a pirate from evading detection simply by placing calls during intervals when no CLID transmission is expected. The frequency of the pseudo-random transmissions is determined by an algorithm and seed resident in the MS 20. As these are never transmitted by the MS, it is not possible for a pirate to accurately predict the time of the next CLID transmission.

In a particularly preferred embodiment (not shown in FIG. 3), when the HLR 26 is notified that the MS is operating in an area with high piracy activity, as determined by the system operator based on past experience, the HLR 26 requests that the MSC 14 of the area in which MS 20 is currently operating generate a new seed and transmit it to the MS 20 The new seed, in combination with the algorithm resident on the MS 20, results in CLID transmissions occurring at more frequent intervals. When the MS leaves the area, CLID frequency is reduced in the same way.

In yet another embodiment (not shown in FIG. 3), a powered-down MS 20 will be automatically powered-up at the appropriate time to send a CLID message and then powered down again to conserve battery power. This feature could be manually disabled when CLID transmission should not occur, such as during a plane flight.

In yet another embodiment, the simultaneous activity check is not performed by the HLR 26 itself, but by a separate Authentication/Privacy Register (APR) 27 (shown in FIG. 2), which has access to the HLR 26 database. In this embodiment, the HLR resources are not diverted to this separate operation, except for acting as an intermediary message transfer node.

The amount of information contained in the piracy alarm message, or that is recorded, varies at the discretion of the system operator. It is preferable that the operator be notified of the cause of the clone alarm, and of the location of the clone as near as can be determined. Upon receiving a piracy alarm, the system operator could attempt to more precisely identify the clone's location by standard techniques, such as signal loop-back time/triangulation.

Figure 4:
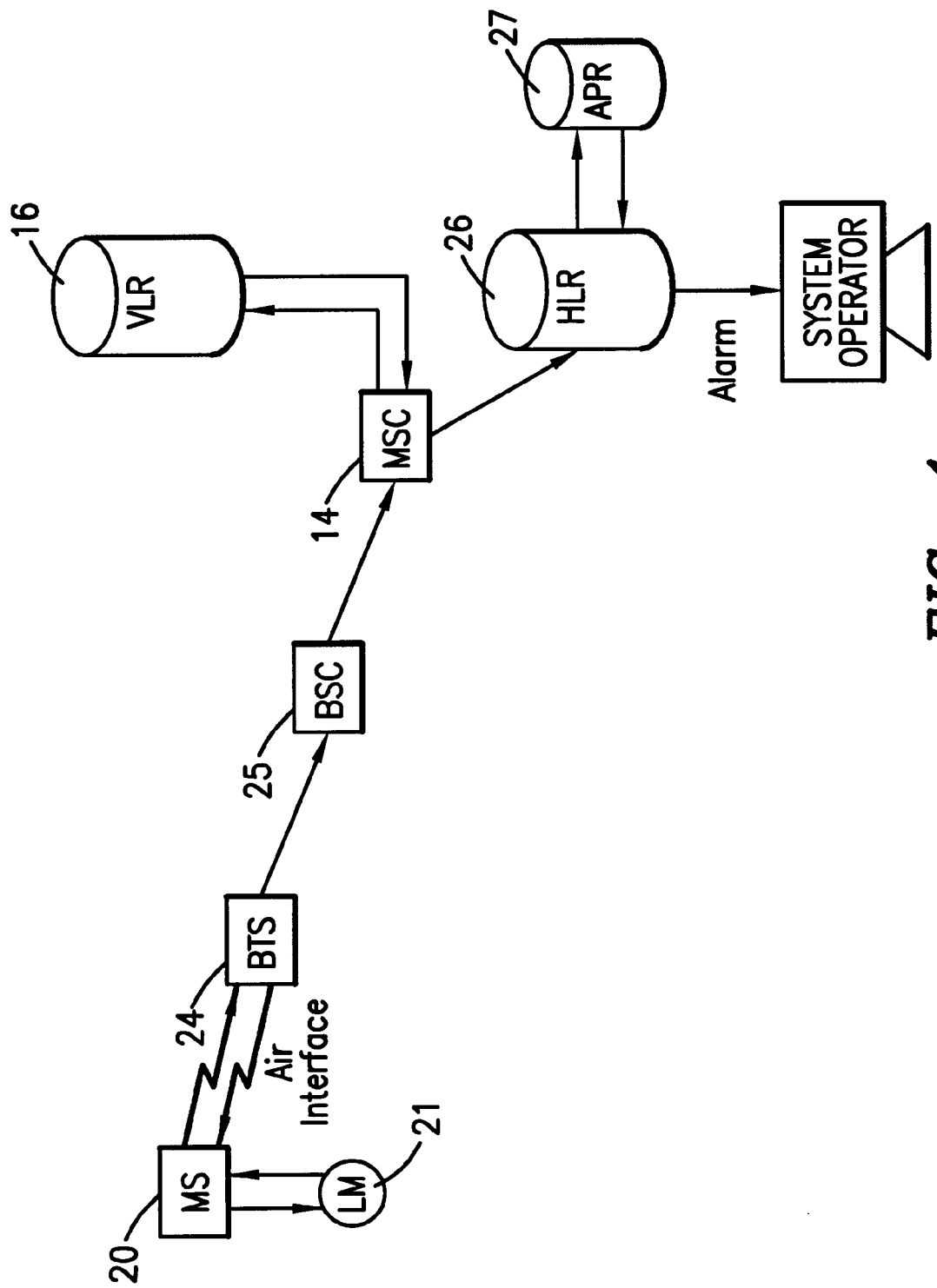
FIG. 4 is a block diagram illustrating the routing of CLID/MS-CLID and last reported location messages in accordance with the present invention.

Reference is now made to FIG. 4, which is a block diagram illustrating another embodiment of the present invention. In this embodiment, increased protection is obtained, although at a higher burden on system resources. Referred to here as "heavyweight" protection, this embodiment provides increased piracy detection in instances when the clone is not active simultaneously with a CLID transmission. To achieve this result, MS 20 has a non-volatile memory address (LM) 21 where the last calculated MS-CLID is stored. In heavyweight configuration, the CLID and MS-CLID are transmitted as aforedescribed in reference to FIG. 2, but in addition, the MS-CLID, preferably including the identifier of the BST, the BSC, and the MSC, along the path traveled by the CLID or registration message, is returned via the same path to MS 20 where it is stored in the LM 21. Generally, when LM 21 stores an MS-CLID received by MS 20, any previously stored information is deleted. It is foreseen, however, that multiple MS-CLIDs could be stored and applied to providing additional protection in accordance with the present invention. Whenever a CLID is generated by MS 20, it includes the last-received MS-CLID stored in LM 21 (and, if desired, additional historical information).

Figure 5:
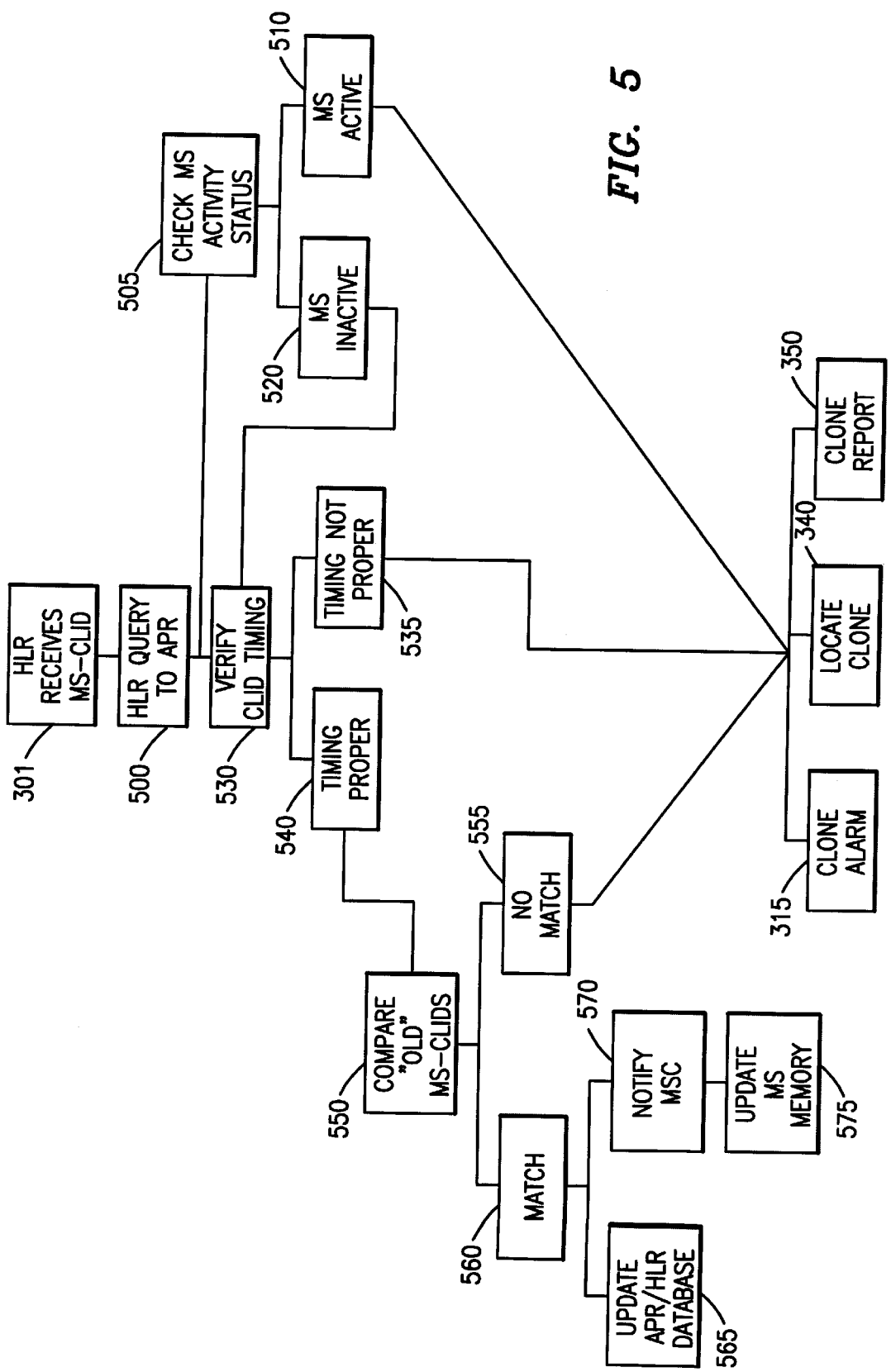
FIG. 5 is a flow chart illustrating how the system uses the MS-CLID in the piracy detection process in accordance with an alternative embodiment of the present invention.

Reference is now made to FIG. 5, which is a flow chart illustrating the heavyweight operation of HLR 26 in conjunction with an associated APR 27. In this embodiment, when the HLR 26 receives an MS-CLID (step 301), it generates a TCAP query containing the MS-CLID and transmits it to APR 27 (step 500). The APR 27 then performs a number of checks (which are hereinafter described in a preferred sequence, but which can be performed in any order without deviating from the spirit of the invention).

First, the APR 27 performs the aforementioned simultaneous activity check. Upon receipt of an MS-CLID, APR 27 determines at step 505 whether any other entity using the same unique MS identifier is active. For the purposes of this embodiment, it is unimportant whether information concerning MS activity status is continually updated in the APR 27 (or HLR 26) database, or whether a separate query must be made to determine the information whenever an MS-CLID is received. As aforedescribed with reference to FIG. 3, if any VLR 16 responds affirmatively, step 510, a piracy condition exists and a clone alarm is generated at step 315. If, on the other hand, no affirmative response is received, step 320, then the other checks are nonetheless performed, preferably beginning with the timing check (step 530).

The APR 27, which has stored in its database the pseudo-random CLID interval algorithm and seed used by MS 20, verifies at step 530 that the CLID was generated at an expected time. Although a pirate may intercept and emulate a CLID, it will not have the algorithm and seed possessed by MS 20 and APR 27. Any CLID transmitted by a clone will therefore almost certainly occur at the wrong interval. If APR 27 determines at step 530 that this has occurred (step 535), a piracy condition exists and a clone alarm is generated (step 315).

In addition, because the previously received MS-CLID was both stored and returned to the MS 20, the APR 27 database (or, alternatively the HLR 26 database) and the LM 21 both hold in storage the same MS-CLID. When the MS 20 next transmits a CLID message, it includes this previous location information ("old MS-CLID"), which is in turn included in the "new MS-CLID" calculated by MSC 14 and transmitted to HLR 26 and APR 27. If step 530 confirms that the CLID was generated at an expected interval (step 540), this old MS-CLID, now contained in the newly received MS-CLID, is compared in step 550 to the old MS-CLID stored in the HLR 26 or APR 27 database. If the old MS-CLIDs do not match, step 555, a possible piracy situation exists or has occurred and a piracy alarm is sent to the system operator, step 315. Of course, if no previous MS-CLID was stored in a system database and transmitted to MS 20 for storage in LM 21, then a "match" will still occur. If a match occurs, step 560, the HLR 26 or APR 27 again updates its database to reflect the newly received MS-CLID, step 565, and notifies the MSC 14 (step 570), which transmits the new MS-CLID to the MS 20, where it replaces the previously stored information in LM 21 (step 575).

Although a specific process is illustrated in FIG. 5, it should be noted that it is not critical to the invention how the data storage, data processing, or alarm functions are allocated between the HLR 26 and the APR 27. Even in the heavyweight embodiment, all functions could be performed by the HLR 26 and it is not necessary in that case that an APR 27 is present. As with the aforedescribed lightweight mode, if the HLR 26 (or APR 27) is updated when an MS 20 becomes active or inactive, a separate TCAP query to determine this status (upon receipt of an MS-CLID) can be eliminated. Also, as aforedescribed with reference to FIG. 3, if desired, the system could also or in the alternative determine the clone's location, step 340, and generate a clone report (step 350).

Although an embodiment of the method and apparatus of the present invention has been illustrated in the accompanying drawings and described in the foregoing detailed description, it will be understood that the invention is not limited to the embodiment disclosed, but is capable of numerous rearrangements, modifications and substitutions without departing from the spirit of the invention as set forth and defined by the following claims.

The previous description is of a preferred embodiment for implementing the scope of the invention should not necessarily be limited by this description. The scope of the present invention is instead defined by the following claims.

What is claimed is:

1. A method for detecting piracy of a mobile station within a cellular telecommunications system, said method comprising the steps of:

maintaining, within a database of said telecommunications system, an activity flag associated with said mobile station, said activity flag being set when said mobile station is active;

transmitting, automatically by said mobile station, an identification signal a plurality of times while said mobile station is idle, wherein said mobile station, if in a powered-off condition at the time said identification signal is scheduled for transmission, automatically powers-on for a period at least long enough for said transmission to occur;

determining, after at least one of said identification signal transmissions, whether said activity flag for said idle mobile station is active; and generating an alarm signal if said activity flag for said idle mobile station is active.

2. The method of claim 1, wherein said identification signal is transmitted by said idle mobile station at pseudo-randomly spaced intervals.

3. The method of claim 2, wherein said pseudo-random intervals are determined using an algorithm that is stored in both said mobile station and said database, and further comprising the steps of:

determining, after at least one of said identification signal transmissions, whether said at least one identification signal transmission occurred at a time predictable by said algorithm; and generating an alarm signal if said at least one identification signal transmission was not sent at a time predictable by said algorithm.

4. The method of claim 2, further comprising the step of varying the frequency of said pseudo-random transmissions by a control signal sent to said mobile station.

5. The method of claim 4, wherein said varying step varies said frequency of said pseudo-random transmissions based on the areas in which said mobile station had been recently operating.

6. The method of claim 1, further comprising the steps of:

maintaining, within a database of said telecommunications system, a last-reported location of said mobile station;

determining, after said at least one identification signal transmission, a current location of said mobile station within said telecommunicating system;

comparing said current location of said mobile station after said identification signal transmission to said last-reported location; and generating an alarm signal if said current location of said mobile station is different from said last reported location.

7. The method of claim 1, further comprising the steps of:

determining, after said at least one identification signal transmission, the identification signal path, wherein said identification signal path includes an identifier corresponding to at least one of the nodes of said telecommunication system through which said identification signal has been most recently transmitted;

maintaining, within a database of said telecommunications system, said identification signal path;

updating, after said comparison step, said last reported location of said mobile station within said location database to the current location;

transmitting, to said mobile station, said identification signal path;

storing, within a memory of said mobile station, said identification signal path as it is received;

transmitting, from said mobile station, a second identification signal, wherein said second identification signal includes said updated identification signal path last received by said mobile station;

comparing said identification signal path within said second identification signal to said identification path in said database of said telecommunications system; and generating an alarm signal if said identification signal path within said second identification signal is different from said identification signal path in said database of said telecommunications network.

8. The method of claim 1, wherein said database of said telecommunications system is located within a home location register of said telecommunications system.

9. The method of claim 1, wherein said determining step is performed within an authentication register in communication with the home location register of said telecommunications network.

10. The method of claim 1, wherein said activity flag indicates whether the mobile station is active based on a query to visitor location registers in communication with said telecommunications system.

11. The method of claim 10, wherein said query is made after at least one of said identification signal transmissions.

12. The method of claim 1, wherein said activity flag is set based on a notification provided by visitor location registers when said mobile station becomes voice-active or inactive.

13. The method of claim 1, additionally comprising the step of determining a specific area in which a suspect clone is operating.

14. The method of claim 13, wherein said suspected operating area is determined by a signal loop-back time triangulation process.

15. The method of claim 1, wherein said alarm signal causes a piracy report to be generated.

16. A method for detecting piracy in a telecommunications system, said method comprising the steps of:

maintaining, within a home location register, a location database containing a plurality of locations of a corresponding plurality of active mobile stations associated with the telecommunications system;

transmitting, from a given one of said mobile stations, a current location identifier, said current location identifier corresponding to said given mobile station;

relaying said current location identifier of said given mobile station to said home location register;

determining, within said home location register upon receipt of said current location identifier, whether an active mobile station identifier, for at least one of said locations in said location database of said active mobile stations, matches said current location identifier;

generating an alarm if, in said step of determining, said current location identifier matches said active mobile station identifier;

determining the location of said given mobile station transmitting said current location identifier;

updating said location database in the home location register to said current location identifier location;

transmitting said current location identifier location to said given mobile station, said given mobile station storing said current location identifier location in a memory therein;

transmitting from said given mobile station, a second current location identifier, said second current location identifier including said stored current location identifier;

comparing said stored current location identifier in said second current location identifier to said current location identifier for said given mobile station in said location database; and generating said alarm if the stored current location identifier within said second current location identification does not match said current location identifier for said given mobile station in said location database of said home location register.

17. The method of claim 16, further comprising the step of:

varying the frequency of said transmission of said current location identifier based on the areas in which said mobile station had been recently operating.

18. The method of claim 16, further comprising the step of determining the location of a suspected clone whenever said alarm is generated.

19. The method of claim 18, wherein said alarm caused a piracy report to be generated.

20. The method of claim 16, further comprising the steps of:

counting the number of current location identifiers transmitted by said given mobile station within a predetermined period; and alerting the system operator if the number of transmissions counted in said counting step exceeds a predetermined threshold.

21. A cellular telecommunications system for detecting piracy of a mobile station, said system comprising:

a home location register having a location database containing the last reported location of a plurality of mobile stations associated with said home location register;

a signal generator in at least one of said mobile stations for sending respective identification messages to said home location register said signal generator varying the frequency of transmission of said respective identification messages based on the areas in which said mobile station had been recently operating;

determining means for determining if said identifier corresponding to a given one of said mobile stations matches the identifier corresponding to at least one other active mobile station sending said respective identification messages; and an alarm generator for generating an alarm if said given one mobile station identifier matches said other active mobile station identifier.

22. The system of claim 21, wherein said home location register determines the current location of said given mobile station and transmits said current location to said mobile station, and further comprising a storage location in said mobile station for storing location information sent to it from said home location register.

23. A method for detecting piracy of a mobile station within a cellular telecommunications system, said method comprising the steps of:

maintaining, within a database of said telecommunications system, an activity flag associated with said mobile station, said activity flag being set when said mobile station is active;

transmitting, by said mobile station, an identification signal a plurality of times while said mobile station is idle, wherein said identification signal is transmitted by said idle mobile station at pseudo-randomly space intervals;

varying the frequency of said pseudo-random transmissions, by a control signal sent to said mobile station, based on the areas in which said mobile station had been recently operating;

determining, after at least one of said identification signal transmissions, whether said activity flag for said idle mobile station is active; and generating an alarm signal if said activity flag for said idle mobile station is active.

* * * * *